US009338723B2

(12) United States Patent
 Aguirre (10) Patent No.: US 9,338,723 B2
(45) Date of Patent: May 10, 2016

(54) SELECTIVE HAND OVER OF A SESSION BASED ON A SPEED AT WHICH A MOBILE DEVICE IS TRAVELING

(71) Applicant: Verizon Patent and Licensing Inc., Arlington, VA (US)

(72) Inventor: Sergio Aguirre, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 6 days.

(21) Appl. No.: 14/482,818

(22) Filed: Sep. 10, 2014

(65) Prior Publication Data
 US 2016/0073318 A1 Mar. 10, 2016

(51) Int. Cl.
 *H04W 36/32* (2009.01)
(52) U.S. Cl.
 CPC .................... *H04W 36/32* (2013.01)
(58) Field of Classification Search
 CPC ..................................................... H04W 36/32
 USPC .......................................................... 455/436
 See application file for complete search history.

(56) References Cited

U.S. PATENT DOCUMENTS

| 2010/0298001 | A1* | 11/2010 | Dimou | .................... H04L 67/02 455/441 |
| 2014/0087739 | A1* | 3/2014 | Weaver | ................. H04W 16/18 455/441 |
| 2014/0335870 | A1* | 11/2014 | Yilmaz | ................. H04W 36/32 455/441 |

OTHER PUBLICATIONS

Wikipedia, "Handover", http://en.wikipedia.org/wiki/Handover, Jun. 10, 2014, 7 pages.

* cited by examiner

*Primary Examiner* — Michael Neff (57) ABSTRACT

A device is configured to establish a session with a mobile device. The session may allow the mobile device to communicate with or via an operator network via the device. The device may determine a speed at which the mobile device is traveling. The device may determine a cell type for a neighbor base station. The cell type may indicate a type of cell that the neighbor base station services. The device may selectively hand over the session to the neighbor base station based on the speed at which the mobile device is traveling and the cell type for the neighbor base station.

20 Claims, 9 Drawing Sheets

SELECTIVE HAND OVER OF A SESSION BASED ON A SPEED AT WHICH A MOBILE DEVICE IS TRAVELING

BACKGROUND

In telecommunications, hand over refers to transferring a session from one base station connected to an operator network to another base station connected to the operator network. An intra-cell handover may occur when a base station hands over the session to itself on a different frequency. An inter-cell handover may occur when a first base station in a first cell hands over the session to a second base station in a second cell. An inter-cell handover may include an intra-frequency/inter-cell handover (e.g., hand over to another cell using the same frequency for the session) and/or an inter-frequency/inter-cell handover (e.g., hand over to another cell using a different frequency for the session).

DETAILED DESCRIPTION OF PREFERRED EMBODIMENTS

The following detailed description of example implementations refers to the accompanying drawings. The same reference numbers in different drawings may identify the same or similar elements.

An inter-cell handover may be based on a signal strength of signals received by a mobile device from different cells. For example, a cell may hand over the session to another cell if the other cell has a stronger signal strength at the mobile device.

An inter-cell handover may be between a first macrocell and a second macrocell, a macrocell and a small cell (e.g., a picocell, a femtocell, and/or a microcell), or a first small cell and a second small cell. Due to relatively small coverage areas of small cells compared to macrocells, handovers based on signal strength may result in an excessive quantity of inter-cell handovers between small cells and small cells, or between small cells and macrocells, when a mobile device is moving at a high speed through an area covered by a small cell (e.g., when the mobile device is traveling in a vehicle). Such an excessive quantity of handovers may result in a higher number of dropped calls, a lower throughput, and/or an overall degraded user experience.

Implementations described herein may hand over a session with a mobile device based on a speed at which the mobile device is traveling. Accordingly, excessive handovers between small cells and small cells, and/or between small cells and macrocells, may be avoided, thus reducing dropped calls, increasing throughput, and/or improving an overall user experience.

Figure 1A:
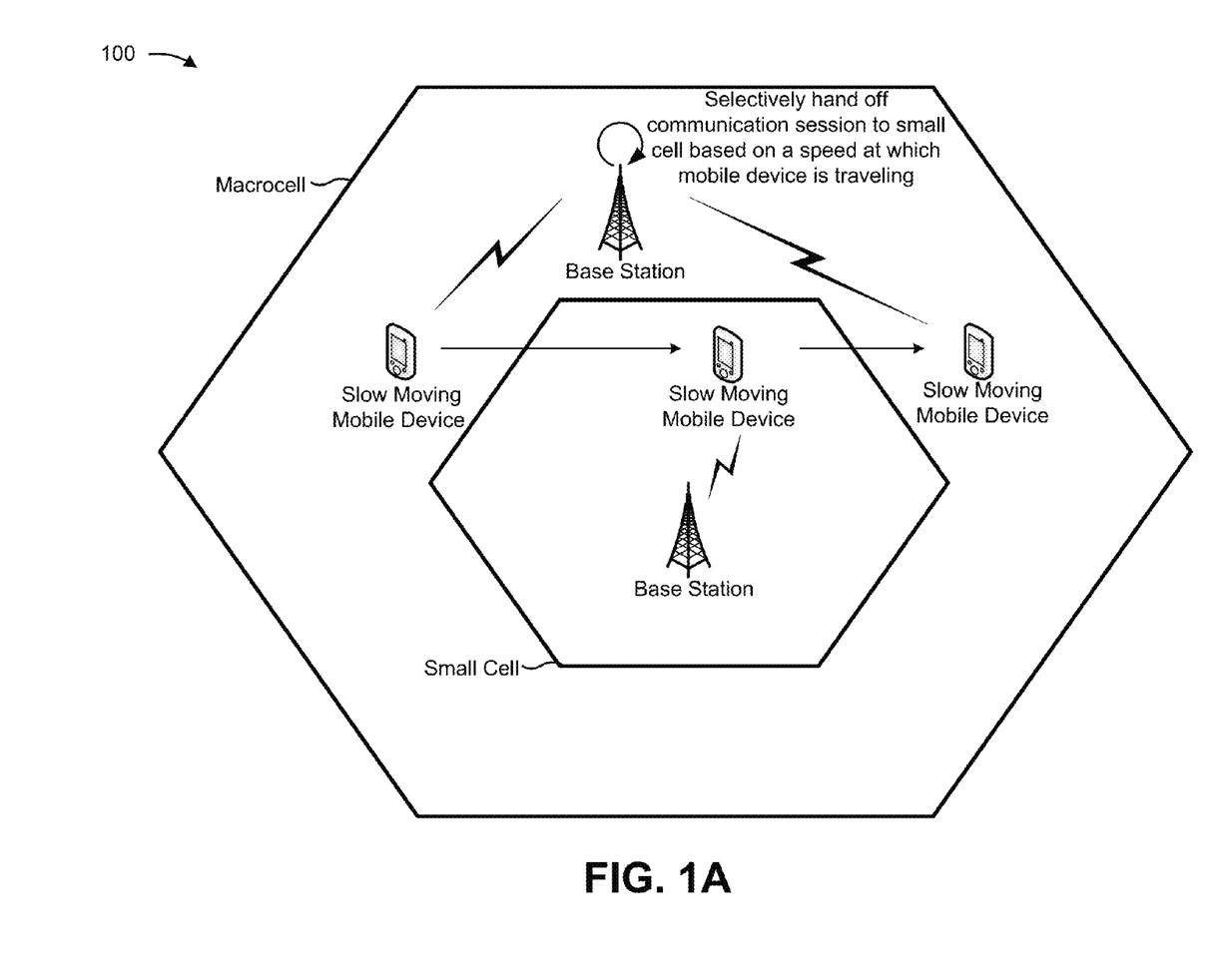
FIGS. 1A and 1B are diagrams of an overview of an example implementation described herein.
Figure 1B:
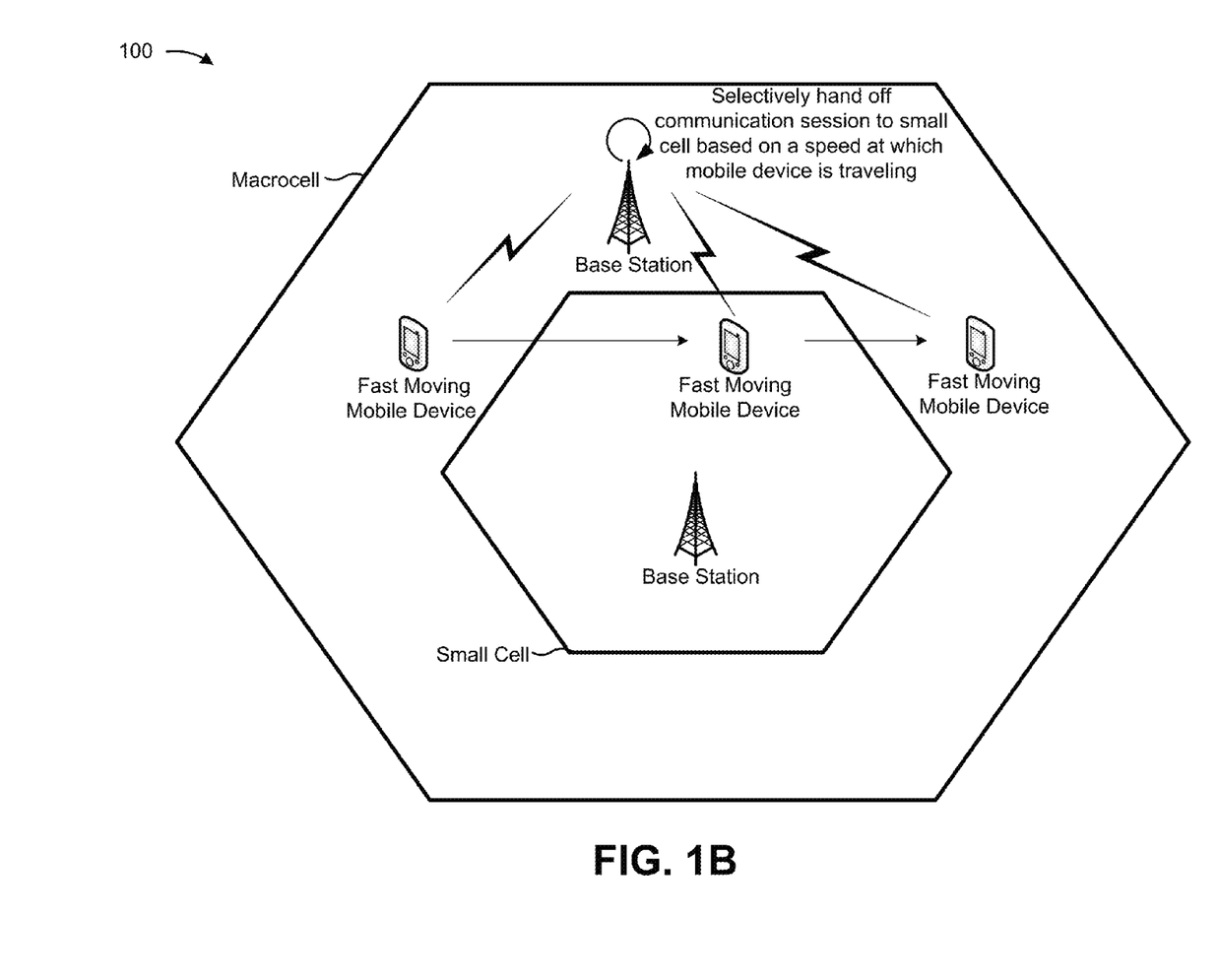

FIGS. 1A and 1B are diagrams of an overview of an example implementation 100 described herein.

As shown in FIG. 1A, assume a slow moving mobile device is traveling through an area covered by a macrocell and a small cell. For example, assume the slow moving mobile device is moving at a speed less than a threshold speed.

Assume the slow moving mobile device starts in an area covered by the macrocell, but not covered by the small cell. Further, assume the slow moving mobile device initiates a session with an operator network via a base station in the macrocell.

As further shown in FIG. 1A, the slow moving mobile device may move into an area covered by both the macrocell and the small cell. Assume the signal strength at the slow moving mobile device from the base station in the small cell is greater than the signal strength from the base station in the macrocell. Accordingly, the macrocell may hand over the session to the small cell based on the signal strength being greater from the small cell and the slow moving mobile device traveling at the relatively slow speed. In other words, the macrocell may hand over the session to the small cell to improve the signal strength of the session and because the mobile device may be covered by the small cell for a relatively long period of time due (e.g., greater than a time threshold) to the relatively slow speed and, thus, avoid another handover within a relative short period of time.

As further shown in FIG. 1A, the slow moving device may move out of the area covered by the small cell and into an area covered by the macrocell. Accordingly, the small cell may hand over the session back to the macrocell.

As shown in FIG. 1B, assume a fast moving mobile device is traveling through an area covered by a macrocell and a small cell. For example, assume the fast moving mobile device is moving at a speed greater than or equal to a threshold speed.

Assume the fast moving mobile device starts in an area covered by the macrocell, but not covered by the small cell. Further, assume the fast moving mobile device initiates a session with an operator network via a base station in the macrocell.

As further shown in FIG. 1B, the fast moving mobile device may move into an area covered by both the macrocell and the small cell. Assume the signal strength, at the fast moving mobile device, from the base station in the small cell is greater than the signal strength from the base station in the macrocell. However, the macrocell may not hand over the session to the small cell based on the fast moving mobile device traveling at the relatively fast speed, even though the small cell has a greater signal strength. The macrocell may not hand over the session because if the session is handed over, the fast moving mobile device may be covered by the small cell for a relatively short period of time due (e.g., less than time threshold) to the relatively fast speed and, thus, another handover within a relative short period of time may occur when the fast moving mobile device moves outside of the area covered by the small cell. Thus, by preventing the handover to the small cell, two handovers within a relative short period of time may be avoided.

As further shown in FIG. 1B, the fast moving device may move out of the area covered by the small cell and into an area covered by the macrocell. The macrocell may continue to service the session at this area.

In this way, an excessive quantity of handovers, which may degrade a user experience, may be avoided and the user experience at a mobile device may be improved.

Figure 2:
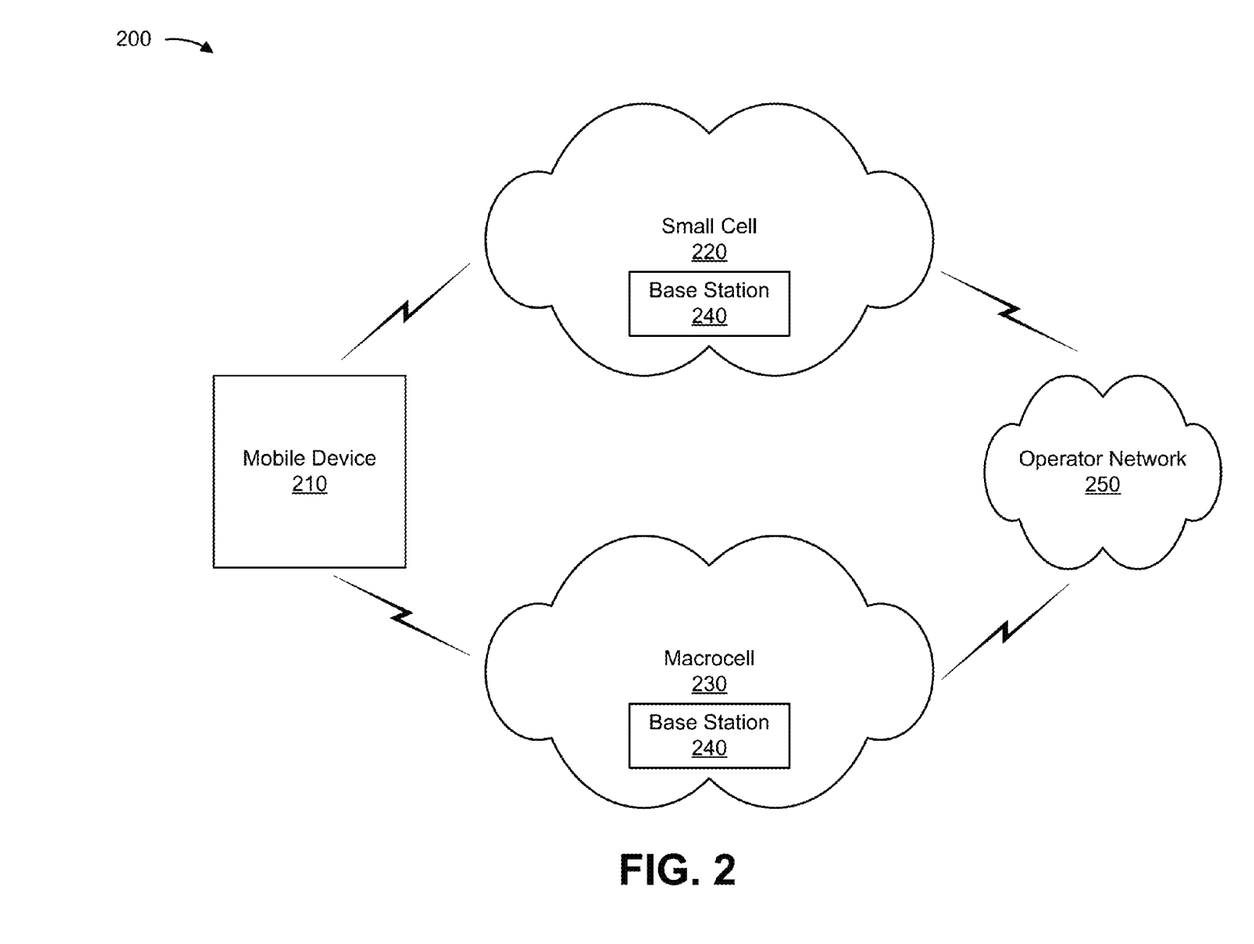
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 210, a small cell 220, a macrocell 230, a base station 240, and/or an operator network 250. Devices of environment 200 may interconnect via wired connections, wireless connections, or a combination of wired and wireless connections.

Mobile device 210 may include a device capable of receiving, generating, storing, processing, and/or providing information. For example, mobile device 210 may include a communications and/or computing device, such as a mobile phone (e.g., a smart phone, a radiotelephone, etc.), a laptop computer, a tablet computer, a handheld computer, a gaming device, or a similar device. In some implementations, mobile device 210 may receive information from and/or transmit information to another device in environment 200. In some implementations, mobile device 210 may communicate with operator network 250 via small cell 220 and/or macrocell 230.

Small cell 220 may be a cell that provides radio coverage to a particular region served by base station 240 (e.g., a low powered base station 240 relative to a high powered base station 240 of macrocell 230). The particular region served by small cell 220 may be smaller than a region served by macrocell 230. Small cell 220 may be a femtocell, a picocell, and/or a microcell. Small cell 220 may include one or more network devices that receive, process, and/or transmit traffic, such as audio, video, text, and/or other data, destined for and/or received from mobile device 210. Small cell 220 may send traffic to and/or receive traffic from mobile device 210 via an air interface.

Macrocell 230 may be a cell that provides radio coverage to a particular region served by base station 240 (e.g., a high powered base station 240 relative to a low powered base station 240 of small cell 220). The particular region served by macrocell 230 may be larger than a region served by small cell 220. In some implementations, the particular region served by macrocell 230 may overlap and/or include the region served by small cell 220. Macrocell 230 may include one or more network devices that receive, process, and/or transmit traffic, such as audio, video, text, and/or other data, destined for and/or received from mobile device 210. Macrocell 230 may send traffic to and/or receive traffic from mobile device 210 via an air interface.

Base station 240 may include one or more devices capable of transferring traffic, such as audio, video, text, and/or other traffic, destined for and/or received from mobile device 210. In some implementations, base station 240 may include an access point and/or an eNodeB (eNB) associated with an LTE network that receives traffic from and/or sends traffic to a network. Additionally, or alternatively, one or more base stations 240 may be associated with a RAN that is not associated with the LTE network. Base station 240 may send traffic to and/or receive traffic from mobile device 210 via an air interface. In some implementations, base station 240 may include a small cell base station (e.g., a low powered base station 240), such as a base station of a microcell, a picocell, and/or a femtocell. Additionally, or alternatively, base station 240 may include a macrocell base station 240 (e.g., a high powered base station 240).

Operator network 250 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations (e.g., base station 240) via which mobile device 210 (e.g., smart phones, tablet computers, machine-to-machine (M2M) devices, etc.) communicate with the EPC. The EPC may include a serving gateway (SGW), a mobility management entity node (MME), and/or a packet data network gateway (PGW) that enables the client devices to communicate with a network and/or an Internet protocol (IP) multimedia subsystem (IMS) core. The IMS core may include a home subscriber server (HSS)/authentication, authorization, accounting (AAA) server, a policy and charging rules function (PCRF) server, and/or a call session control function (CSCF) server and may manage certain information and services, such as authentication, session initiation, account information, and/or a user profile, associated with the mobile devices 210. The LTE network may include multiple base stations 240, and the EPC may include multiple SGWs, MMEs, and/or PGWs. Additionally, or alternatively, operator network 250 may include a cellular network, a public land mobile network (PLMN), a second generation (2G) network, a third generation (3G) network, a fourth generation (4G) network, a fifth generation (5G) network, and/or a similar type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
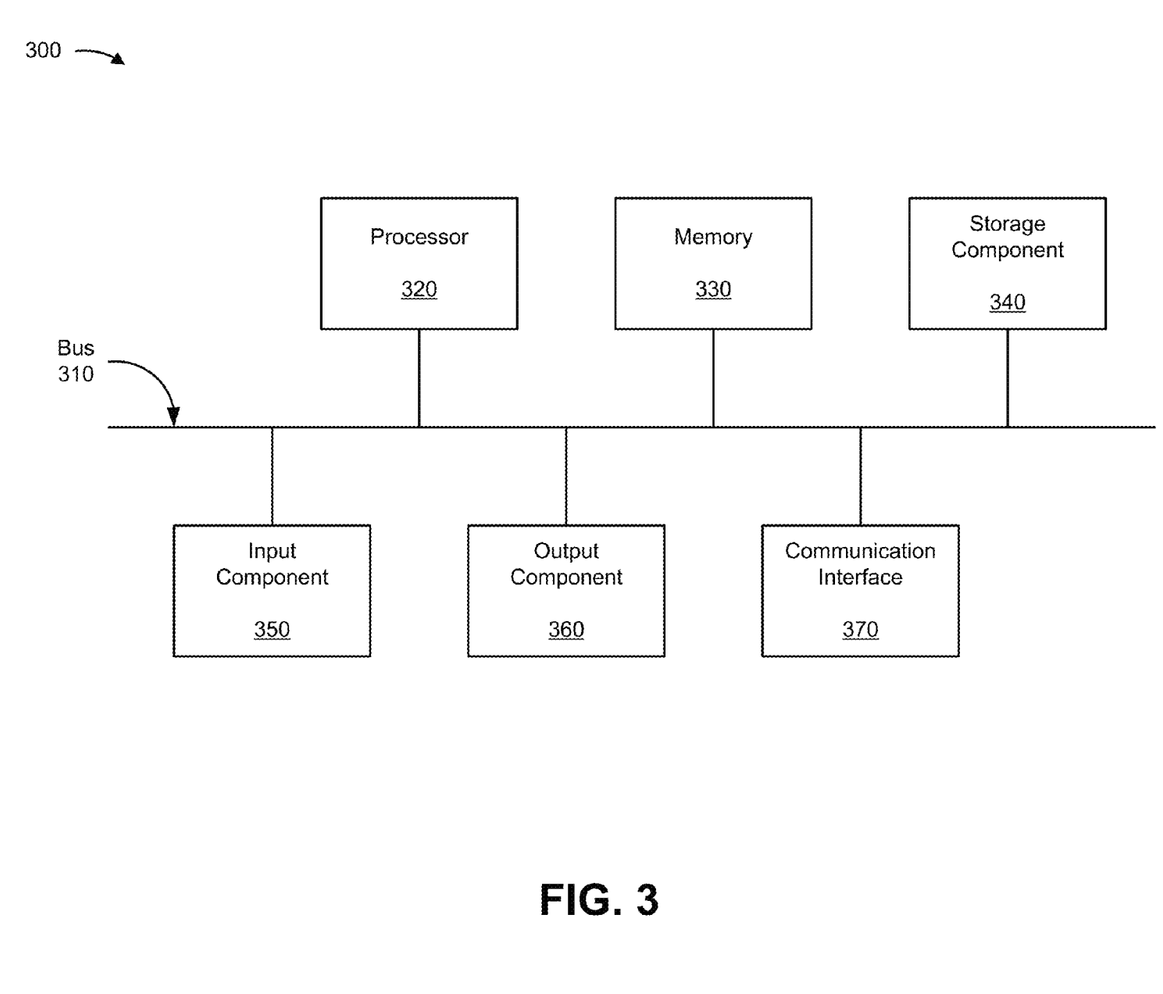
FIG. 3 is a diagram of example components of one or more devices of FIG. 2.

FIG. 3 is a diagram of example components of a device 300. Device 300 may correspond to mobile device 210 and/or base station 240. In some implementations, mobile device 210 and/or base station 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
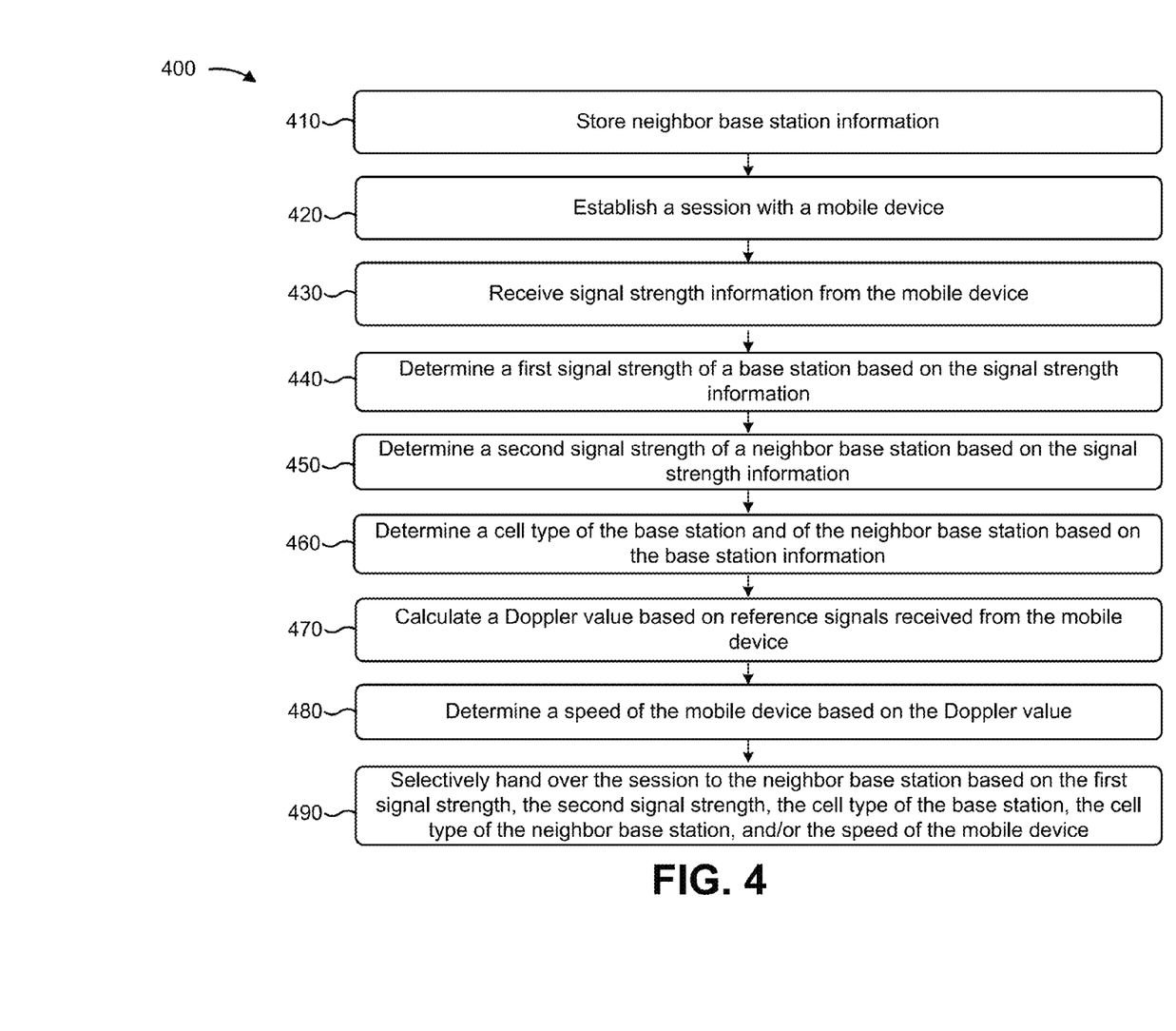
FIG. 4 is a flow chart of an example process for selectively handing over a session based on a speed at which a mobile device is traveling.

FIG. 4 is a flow chart of an example process 400 for selectively handing over a session based on a speed at which mobile device 210 is traveling. In some implementations, one or more process blocks of FIG. 4 may be performed by base station 240 (e.g., a base station 240 included in small cell 220 and/or a base station 240 included in macrocell 230). Additionally, or alternatively, one or more process blocks of FIG. 4 may be performed by another device or a group of devices separate from or including base station 240, such as mobile device 210.

As shown in FIG. 4, process 400 may include storing base station information (block 410). For example, base station 240 may store the base station information in a memory included in or accessible by base station 240.

In some implementations, the base station information may identify neighbor base stations 240 to which the base station 240, storing the base station information, may hand over a session and/or receive a handover of a session. As used herein, the term "neighbor base station 240" may refer to a base station 240 to which another base station 240 may hand over a session and/or receive a handover of a session. A neighbor base station 240 may be included in a cell (e.g., small cell 220 or macrocell 230) that is adjacent to, included in, and/or overlaps with a cell serviced by the other base station 240.

Additionally, or alternatively, the base station information may indicate a cell type of a cell that each of the neighbor base stations 240 services. For example, the base station information may indicate whether a respective neighbor base station 240 is included in a small cell 220 (e.g., a picocell, a femtocell, or a microcell) or a macrocell 230. Likewise, the base station information may indicate a cell type of a cell that base station 240 services (e.g., the base station 240 that stores the base station information).

In some implementations, each base station 240 may store respective base station information that uniquely identifies neighbor base stations 240 for the respective base station 240.

As further shown in FIG. 4, process 400 may include establishing a session with mobile device 210 (block 420). For example, base station 240 may establish a session with mobile device 210.

The session may be a communication session between mobile device 210 and base station 240 that mobile device 210 uses to communicate with or via operator network 250. In some implementations, mobile device 210 may be in a Radio Resource Control (RRC) mode for the session. The RRC mode may allow hand over of the session between base stations 240 in small cells 220 and/or macrocells 230.

In some implementations, base station 240 may establish the session by initiating a new session with mobile device 210. Additionally, or alternatively, base station 240 may establish the session by receiving a handover of a current session from a neighbor base station 240.

As further shown in FIG. 4, process 400 may include receiving signal strength information from mobile device 210 (block 430). For example, base station 210 may receive the signal strength information from mobile device 210.

Mobile device 210 may measure the signal strength of signals received from each of multiple base stations 240 and generate information indicating the signal strength. For example, the information indicating the signal strength may indicate a received signal strength indicator (RSSI) and/or a reference signal received power (RSRP) for each base station 240 (or associated cell) from which mobile device 210 receives a signal.

Mobile device 210 may generate signal strength information that associates the signal strength of a respective base station 240 (e.g., the RSSI and/or the RSRP) and an identifier for the respective base station 240 (or associated cell). Accordingly, the signal strength information may indicate the signal strengths at mobile device 210 for multiple base stations 240, including the base station 240 that receives the signal strength information and neighbor base stations 240.

Mobile device 210 may send the signal strength information to base station 240 and base station 240 may receive the signal strength information.

As further shown in FIG. 4, process 400 may include determining a first signal strength of base station 240 based on the signal strength information (block 440). For example, base station 240 may determine the first signal strength.

The first signal strength may be the signal strength at mobile device 210 of a signal emitted by the base station 240 that receives the signal strength information. In other words, the first signal strength may be a signal strength of base station 240's own signal.

Base station 240 may determine the first signal strength by identifying the signal strength associated with the identifier for base station 240 (or the associated cell) included in the signal strength information.

As further shown in FIG. 4, process 400 may include determining a second signal strength of a neighbor base station 240 based on the signal strength information (block 440). For example, base station 240 may determine the second signal strength.

The second signal strength may be the signal strength at mobile device 210 of a signal emitted by a neighbor base station 240. In other words, the second signal strength may be a signal strength of a neighbor base station 240 to which base station 240 may hand over the session.

Base station 240 may determine the second signal strength by identifying the signal strength associated with an identifier for the neighbor base station 240 (or the associated cell) included in the signal strength information. In some implementations, base station 240 may determine a second signal strength for each of one or more neighbor base stations 240.

As further shown in FIG. 4, process 400 may include determining a cell type of base station 240 and of the neighbor base station 240 based on the base station information (block 460). For example, base station 240 may determine the cell type of the cell that base station 240 services and the cell type of the cell that the neighbor base station 240 services.

In some implementations, base station 240 may determine the cell type for base station 240 by identifying the cell type associated with base station 240 indicated by the base station information Likewise, base station 240 may determine the cell type for the neighbor base station 240 by identifying the cell type associated with the neighbor base station 240 indicated by the base station information. As previously discussed, a cell type may include a small cell type (e.g., a femtocell, a picocell, or a microcell) or a macrocell type, in some implementations.

As further shown in FIG. 4, process 400 may include calculating a Doppler value based on reference signals received from mobile device 210 (block 470). For example, base station 240 may calculate the Doppler value.

Per LTE 3rd Generation Partnership Project (3GPP) specifications, base station 240 may receive uplink reference signals (e.g., Demodulation Reference Signals (DM-RS)) from mobile device 210 during the session. The reference signals may be used to enable coherent signal demodulation at base station 240 and may have a particular frequency (herein referred to as a "reference signal frequency").

In some implementations, mobile device 210 may be moving relative to base station 240. In other words, mobile device 210 may be traveling at a particular speed. For example, a user of mobile device 210 may be walking with the mobile device 210 or have mobile device 210 in a vehicle that is moving. Accordingly, a Doppler effect may result at base station 240 based on mobile device 210 moving while emitting the reference signals at the reference signal frequency.

For example, if mobile device 210 is moving toward base station 240, each successive wave crest of the reference signal is emitted from a position closer to base station 240 than the previous wave in the reference signal. Therefore, a time between an arrival of successive wave crests of the reference signal at base station 240 is reduced, causing an increase in the reference signal frequency. On the other hand, if mobile device 210 is moving away from base station 240, each successive wave crest of the reference signal is emitted from a position farther from base station 240 than the previous wave in the reference signal. Therefore, a time between an arrival of successive wave crests of the reference signal at base station 240 is increased, causing a decrease in the reference signal frequency.

Base station 240 may calculate a Doppler value based on the coherent demodulation of the reference signal. The Doppler value may represent a rate of change of the reference signal frequency at base station 240. For example, base station 240 may calculate the Doppler value by detecting the frequency of the reference signal ("an observed frequency") over time and calculating a second derivative of phase change over time of the reference signal. The Doppler value may be proportional to the speed of mobile device 210.

As further shown in FIG. 4, process 400 may include determining a speed of mobile device 210 based on the Doppler value (block 480). For example, base station 240 may determine the speed of mobile device 210.

In some implementations, base station 240 may store a data structure that associates speeds with Doppler values and reference signal frequencies. For example, the data structure may include a look-up table that allows base station 240 to search for a speed based on a Doppler value and a reference signal frequency.

In some implementations, base station 240 may calculate the speed of mobile device 210 based on the reference signal frequency, the observed frequency, and/or a speed at which the reference signal travels.

In some implementations, mobile device 210 may detect the speed of mobile device 210. For example, mobile device 210 may use an included GPS device to determine the speed of mobile device 210 based on a distance traveled in a particular amount of time. Mobile device 210 may send speed information to base station 240 that indicates the speed of mobile device 210. Base station 240 may receive the speed information and determine the speed of mobile device 210 based on the speed information.

As further shown in FIG. 4, process 400 may include selectively handing over the session to the neighbor base station 240 based on the first signal strength, the second signal strength, the cell type of base station 240, the cell type of the neighbor base station 240, and/or the speed of mobile device 210 (block 490). For example, base station 240 may selectively hand over the session to the neighbor base station 240.

Base station 240 may store rules for determining whether to hand over a session to the neighbor base station 240. The rules may indicate conditions for handing over the session based on a first relationship between a speed $V_{MD}$ of mobile device 210 and a threshold speed $V_T$, and a second relationship between the first signal strength $S_1$ of base station 240 and the second signal strength $S_2$ of the neighbor base station 240. The second relationship may also be modified by a bias value B. The bias value B may a positive value, a negative value, or zero. Base station 240 may selectively hand over the session based on the rules.

For example, base station 240 may store a first set of rules that applies when the cell type of base station 240 is a macrocell type and the cell type of the neighbor base station 240 is a small cell type. In other words, the first set of rules may apply when a base station 240 in a macrocell 230 is determining whether to hand over a session to a neighbor base station 240 in a neighbor small cell 220. The first set of rules may include rules 1A-1D.

Rule 1A: if $V_{MD} \geq V_T$ AND $S_2 \geq S_1 + B$, then no hand over from macrocell 230 to neighbor small cell 220 (e.g., no hand over from base station 240 in macrocell 230 to neighbor base station 240 in neighbor small cell 220). In other words, if the speed $V_{MD}$ of mobile device 210 is greater than or equal to a threshold speed $V_T$ and the second signal strength $S_2$ from neighbor small cell 220 is greater than or equal to the first signal strength $S_1$ from macrocell 230 adjusted by a bias value B, then macrocell 230 will continue to service the session and will not hand over the session to neighbor small cell 220. Accordingly, even though mobile device 210 may receive a stronger signal from neighbor small cell 220 than from macrocell 230, macrocell 230 will continue to service the session to avoid a handover of a session with a mobile device 210 that is moving at a speed that satisfies a threshold value. In this way, a first handover to neighbor small cell 220 that mobile device 210 may pass through quickly may be avoided. A second handover resulting within a relatively short period of time when mobile device 210 leaves small cell 220 may also be avoided.

In some implementations, Rule 1A may be modified such that if the first signal strength $S_1$ from macrocell 230 fails to satisfy a threshold signal strength $S_T$, then macrocell 230 may hand over the session to the neighbor small cell 220 regardless of the speed $V_{MD}$ of mobile device 210. In this way, a macrocell 230 with a weak signal strength at mobile device 210 (e.g., a signal strength that does not satisfy the threshold signal strength) may hand over the session to ensure the session is serviced with a proper signal strength.

Rule 1B: if $V_{MD} \geq V_T$ AND $S_2 < S_1 + B$, then no hand over from macrocell 230 to neighbor small cell 220 (e.g., no hand over from base station 240 in macrocell 230 to neighbor base station 240 in neighbor small cell 220). In other words, if the speed $V_{MD}$ of mobile device 210 is greater than or equal to a threshold speed $V_T$ and the second signal strength $S_2$ from neighbor small cell 220 is less than the first signal strength $S_1$ from macrocell 230 adjusted by a bias value B, then macrocell 230 will continue to service the session and will not hand over the session to neighbor small cell 220. Accordingly, macrocell 230 will continue to service the session to avoid a handover of a session with a mobile device 210, which is moving at a speed that satisfies a threshold value, to neighbor small cell 220 that mobile device 210 may pass through quickly. In this way, a first handover to neighbor small cell 220 that mobile device 210 may pass through quickly, and a second handover resulting within a relatively short period of time when mobile device 210 leaves small cell 220, may be avoided.

Rule 1C: if $V_{MD} < V_T$ AND $S_2 \geq S_1 + B$, then hand over from macrocell 230 to neighbor small cell 220 (e.g., hand over from base station 240 in macrocell 230 to neighbor base station 240 in neighbor small cell 220). In other words, if the speed $V_{MD}$ of mobile device 210 is less than a threshold speed $V_T$ and the second signal strength $S_2$ from neighbor small cell 220 is greater than or equal to the first signal strength $S_1$ from macrocell 230 adjusted by a bias value B, then macrocell 230 may hand over the session to neighbor small cell 220. Accordingly, the session may be handed over to neighbor small cell 220 that has a stronger signal strength than macrocell 230 when mobile device 210 is traveling at a relatively slow speed. In this way, a first handover to neighbor small cell 220 may occur to ensure the session is serviced by a strong signal, while avoiding a second handover within a relatively short period of time because mobile device 210 may be in neighbor small cell 220 for a relatively long period of time due to the relatively slow speed of mobile device 210.

Rule 1D: if $V_{MD} < V_T$ AND $S_2 < S_1 + B$, then no hand over from macrocell 230 to neighbor small cell 220 (e.g., no hand over from base station 240 in macrocell 230 to neighbor base station 240 in neighbor small cell 220). In other words, if the speed $V_{MD}$ of mobile device 210 is less than a threshold speed $V_T$ and the second signal strength $S_2$ from neighbor small cell 220 is less than the first signal strength $S_1$ from macrocell 230 adjusted by a bias value B, then macrocell 230 will continue to service the session and will not hand over the session to the neighbor small cell 220. Accordingly, macrocell 230 will continue to service the session to avoid a handover of a session with a mobile device 210 to neighbor small cell 220 with a weaker signal strength than the signal from macrocell 230. In this way, the session may continue to be serviced by the stronger signal from macrocell 230 and a handover is avoided.

Additionally, or alternatively, base station 240 may store a second set of rules that applies when the cell type of base station 240 is a small cell type and the cell type of the neighbor base station 240 is a macrocell type. In other words, the second set of rules may apply when a base station 240 in a small cell 220 is determining whether to hand over a session to a neighbor base station 240 in a neighbor macrocell 230. The second set of rules may include rules 2A-2D.

Rule 2A: if $V_{MD} \geq V_T$ AND $S_2 \geq S_1 + B$, then hand over from small cell 220 to neighbor macrocell 230 (e.g., hand over from base station 240 in small cell 220 to neighbor base station 240 in neighbor macrocell 230). In other words, if the speed $V_{MD}$ of mobile device 210 is greater than or equal to a threshold speed $V_T$ and the second signal strength $S_2$ from neighbor macrocell 230 is greater than or equal to the first signal strength $S_1$ from small cell 220 adjusted by a bias value B, then small cell 220 may hand over the session to the neighbor base station 240. In this way, the session may be serviced by the stronger signal from macrocell 230. Furthermore, it may be ensured that mobile device 210 that is moving at a relatively fast speed (e.g., greater than or equal to the threshold speed $V_T$) may be serviced by neighbor macrocell 230 where fewer handovers may be required than if mobile device 210 is serviced by small cell 220.

Rule 2B: if $V_{MD} \geq V_T$ AND $S_2 < S_1 + B$, then hand over from small cell 220 to neighbor macrocell 230 (e.g., hand over from base station 240 in small cell 220 to neighbor base station 240 in neighbor macrocell 230). In other words, if the speed $V_{MD}$ of mobile device 210 is greater than or equal to a threshold speed $V_T$ and the second signal strength $S_2$ from neighbor macrocell 230 is less than the first signal strength $S_1$ from small cell 220 adjusted by a bias value B, then small cell 220 will hand over the session to neighbor macrocell 230. Accordingly, even though mobile device 210 may receive a stronger signal from small cell 220 than from neighbor macrocell 230, macrocell 230 may service the session so that fewer handovers may be required than if mobile device 210 is serviced by small cell 220 due macrocell 230 serving a larger region than small cell 220.

In some implementations, Rule 2B may be modified such that if the second signal strength $S_2$ from neighbor macrocell 230 fails to satisfy a threshold signal strength $S_T$, then small cell 220 may not hand over the session to the neighbor macrocell 230 regardless of the speed $V_{MD}$ of mobile device 210. In this way, a neighbor macrocell 230 with a weak signal strength at mobile device 210 (e.g., a signal strength that does not satisfy the threshold signal strength) may be prevented from servicing the session to ensure the session is serviced with a proper signal strength.

Rule 2C: if $V_{MD} < V_T$ AND $S_2 \geq S_1 + B$, then hand over from small cell 220 to neighbor macrocell 230 (e.g., hand over from base station 240 in small cell 220 to neighbor base station 240 in neighbor macrocell 230). In other words, if the speed $V_{MD}$ of mobile device 210 is less than a threshold speed $V_T$ and the second signal strength $S_2$ from neighbor macrocell 230 is greater than or equal to the first signal strength $S_1$ from small cell 220 adjusted by a bias value B, then small cell 220 may hand over the session to neighbor macrocell 230. Accordingly, the session may be handed over to neighbor macrocell 230 that has a stronger signal strength than small cell 220 when mobile device 210 is traveling at a relatively slow speed. In this way, the session may be serviced by the stronger signal from macrocell 230.

Rule 2D: if $V_{MD}<V_T$ AND $S_2<S_1+B$, then no hand over from small cell 220 to neighbor macrocell 230 (e.g., no hand over from base station 240 in small cell 220 to neighbor base station 240 in neighbor macrocell 230). In other words, if the speed $V_{MD}$ of mobile device 210 is less than a threshold speed $V_T$ and the second signal strength $S_2$ from neighbor macrocell 230 is less than the first signal strength $S_1$ from small cell 220 adjusted by a bias value B, then small cell 220 will continue to service the session and will not hand over the session to the neighbor macrocell 230. Accordingly, the session may not be handed over to neighbor macrocell 230 that has a weaker signal strength than small cell 220 when mobile device 210 is traveling at a relatively slow speed. In this way, a stronger signal strength may be used for the session while avoiding a handover within a relatively short period of time because mobile device 210 may be in small cell 220 for a relatively long period of time due to the relatively slow speed of mobile device 210.

Additionally, or alternatively, base station 240 may store a third set of rules that applies when the cell type of base station 240 is a macrocell type and the cell type of the neighbor base station 240 is a macrocell type. In other words, the third set of rules may apply when a base station 240 in a macrocell 230 is determining whether to hand over a session to a neighbor base station 240 in a neighbor macrocell 230. The third set of rules may include rules 3A and 3B.

Rule 3A: if $S_2<S_1+B$, then no hand over from macrocell 230 to neighbor macrocell 230 (e.g., no hand over from base station 240 in macrocell 230 to neighbor base station 240 in neighbor macrocell 230). In other words, if the second signal strength $S_2$ from the neighbor macrocell 230 is less than the first signal strength $S_1$ from macrocell 230 adjusted by a bias value B, then macrocell 230 may not hand over the session to neighbor macrocell 230. In this way, a handover is avoided and the macrocell 230 with the strongest signal strength may service the session.

Rule 3B: if $S_2 \geq S_1+B$, then hand over from macrocell 230 to neighbor macrocell 230 (e.g., hand over from base station 240 in macrocell 230 to neighbor base station 240 in neighbor macrocell 230). In other words, if the second signal strength $S_2$ from the neighbor macrocell 230 is greater than or equal to the first signal strength $S_1$ from macrocell 230 adjusted by a bias value B, then macrocell 230 may hand over the session to neighbor macrocell 230. In this way, the macrocell 230 with the strongest signal strength may service the session.

Additionally, or alternatively, base station 240 may store a fourth set of rules that applies when the cell type of base station 240 is a small cell type and the cell type of the neighbor base station 240 is a small cell type. In other words, the fourth set of rules may apply when a base station 240 in a small cell 220 is determining whether to hand over a session to a neighbor base station 240 in a neighbor small cell 220. The fourth set of rules may include rules 4A and 4B.

Rule 4A: if $S_2<S_1+B$, then no hand over from small cell 220 to neighbor small cell 220 (e.g., no hand over from base station 240 in small cell 220 to neighbor base station 240 in neighbor small cell 220). In other words, if the second signal strength $S_2$ from neighbor small cell 220 is less than the first signal strength $S_1$ from small cell 220 adjusted by a bias value B, then small cell 220 may not hand over the session to neighbor small cell 220. In this way, a handover is avoided and the small cell 220 with the strongest signal strength may service the session.

Rule 4B: if $S_2 \geq S_1+B$, then hand over from small cell 220 to neighbor small cell 220 (e.g., hand over from base station 240 in small cell 220 to neighbor base station 240 in neighbor small cell 220). In other words, if the second signal strength $S_2$ from the neighbor small cell 220 is greater than or equal to the first signal strength $S_1$ from small cell 220 adjusted by a bias value B, then small cell 220 may hand over the session to neighbor small cell 220. In this way, the small cell 220 with the strongest signal strength may service the session.

In some implementations, if an above rule is satisfied such that a handover from a base station 240 (in a small cell 220 or a macrocell 230) to a neighbor small cell 220 is determined, base station 240 may determine if a neighbor macrocell 230 satisfies any of the rules such that the session may be handed over to the neighbor macrocell 230 instead of the neighbor small cell 220. In other words, a handover to a macrocell 230 that satisfies a rule may take priority over a handover to a small cell 220 that satisfies a rule. Additionally, or alternatively, a handover to a macrocell 230 that satisfies a rule may take priority only if the speed $V_{MD}$ of the mobile device 210 is greater than or equal to the threshold speed $V_T$. In this way, handovers to small cells 220 may be avoided when mobile device 210 is traveling at a relatively fast speed and when a macrocell 230 is available to accept the handover.

Although the above described rules have been described with respect to whether the speed VMD of the mobile device 210 satisfies the threshold speed $V_T$, the speed $V_{MD}$ may be replaced with Doppler value D (calculated at block 470) and the threshold speed $V_T$ may be replaced with a threshold Doppler value $D_T$. In other words, the above described rules may be determined with respect to whether the Doppler value D satisfies the threshold Doppler value $D_T$ instead of, or in addition to, whether the speed $V_{MD}$ of the mobile device 210 satisfies the threshold speed $V_T$.

In some implementations, base station 240 may measure a block error rate (BLER) of a signal from mobile device 210. The BLER may be proportional to the speed at which mobile device 210 is moving. For example, the BLER may increase as the speed at which mobile device 210 is moving increases. Accordingly, base station 240 may use the BLER as a proxy for the speed of mobile device 210. In other words, although the above described rules have been described with respect to whether the speed $V_{MD}$ of the mobile device 210 satisfies the threshold speed $V_T$, the speed $V_{MD}$ may be replaced with the BLER and the threshold speed $V_T$ may be replaced with a threshold BLER. In other words, the above described rules may be determined with respect to whether the BLER satisfies the threshold BLER instead of, or in addition to, whether the speed $V_{MD}$ of the mobile device 210 satisfies the threshold speed $V_T$.

Accordingly, base station 240 may selectively hand over the session based on the above described rules.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Although process 400 has been described with respect to a base station 240, which is currently servicing the session, determining whether to hand over the session and selectively handing over the session, process 400 may also be performed by a neighbor base station 240. In other words, a neighbor base station 240 may determine whether a session, currently serviced by another base station 240, should be handed over to the neighbor base station 240. The neighbor base station 240 may selectively cause the session to be handed over to the neighbor base station 240.

FIGS. 5A-5D are diagrams of an example implementation 500 relating to example process 400 shown in FIG. 4. FIGS.

5A-5D show an example of selectively handing over a session based on a speed at which mobile device 210 is traveling.

Figure 5A:
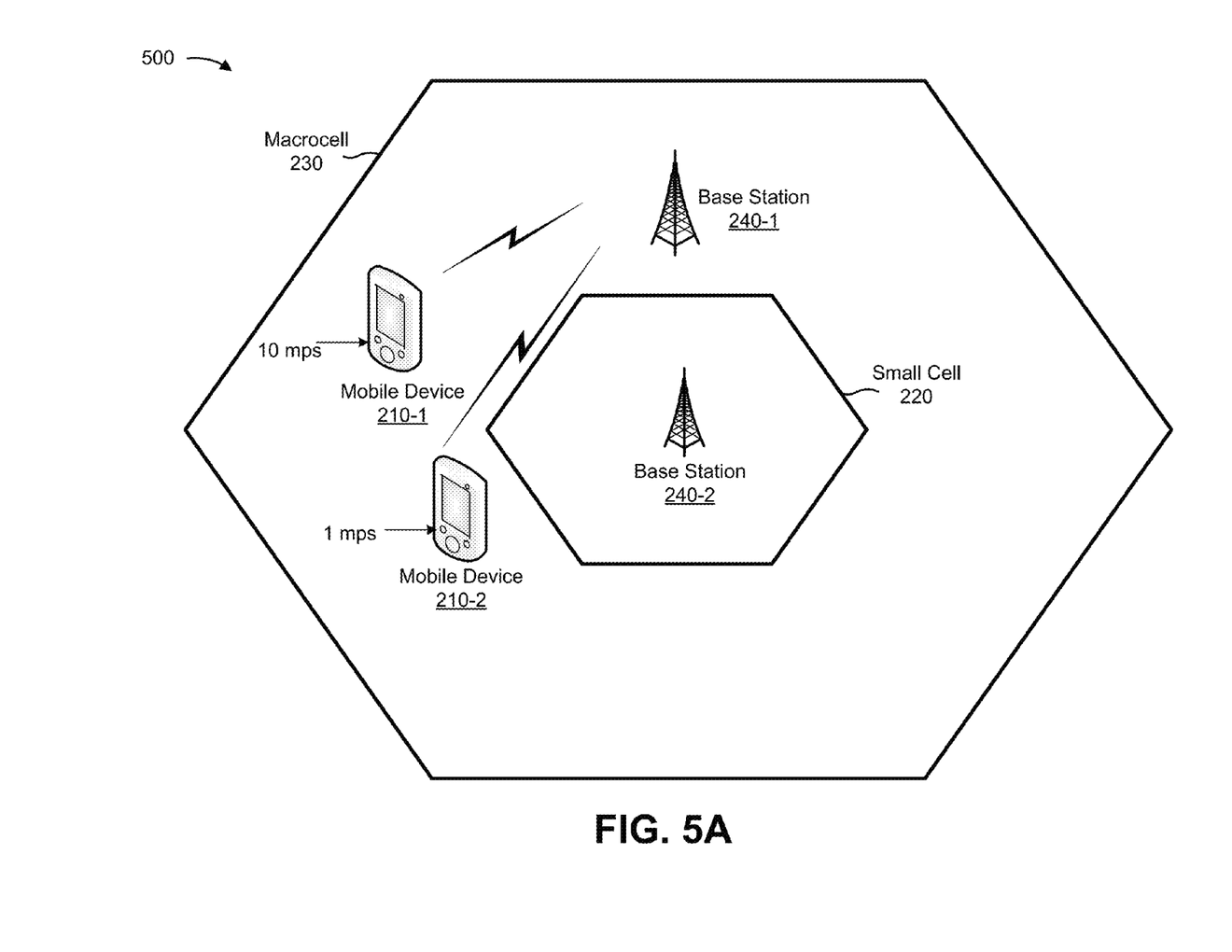
FIGS. 5A-5D are diagrams of an example implementation relating to the example process shown in FIG. 4.

As shown in FIG. 5A, assume mobile device 210-1 and mobile device 210-2 are both located in an area covered my macrocell 230 at a time $t_1$. Further, assume mobile device 210-1 is traveling at a speed of 10 meters per second (mps). For example, mobile device 210-1 may be used by a user traveling in a vehicle. Also, assume mobile device 210-2 is traveling at a speed of 1 mps. For example, mobile device 210-2 may be used by a user that is walking.

As further shown in FIG. 5A, assume mobile device 210-1 has a first session established with mobile base station 240-1, and mobile device 210-2 has a second session established with base station 240-1, which services sessions for macrocell 230. Accordingly, base station 240-1 may have a macrocell type. Small cell 220 may be serviced by base station 240-2. Accordingly, base station 240-2 may have a small cell type.

Figure 5B:
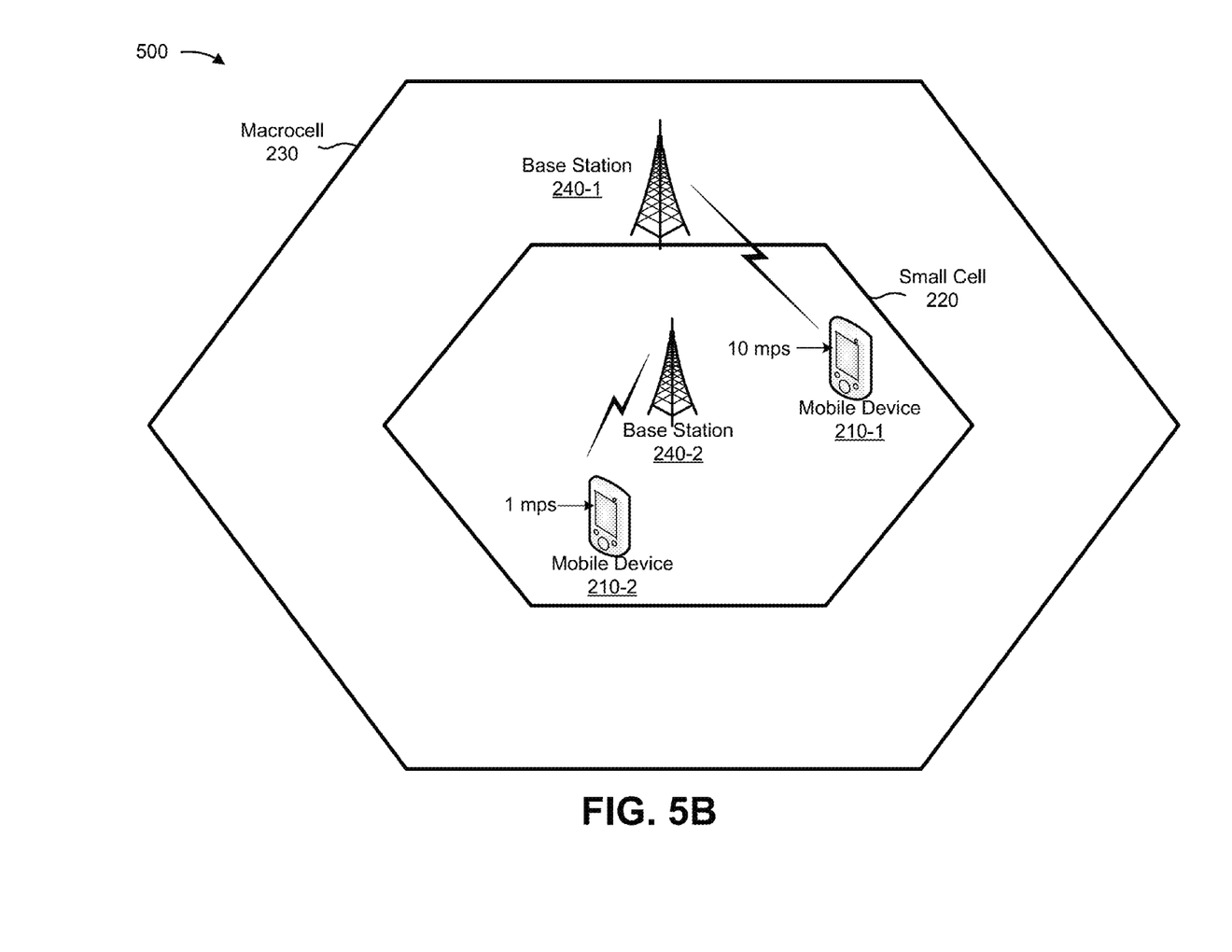

A shown in FIG. 5B, mobile device 210-1 and mobile device 210-2 may move into an area covered by macrocell 230 and small cell 220 at a time $t_2$. Assume mobile device 210-1 is traveling at a speed of 10 meters per second (mps) at time $t_2$. Also, assume mobile device 210-2 is traveling at a speed of 1 mps at time $t_2$. Further, assume a threshold speed $V_T$ is equal to 2 mps.

Mobile device 210-1 and mobile device 210-2 may each send signal strength information to base station 240-1. Assume the signal strength information indicates, for the first session and the second session, that the signal strength $S_2$ from base station 240-2 is stronger than the signal strength $S_1$ from base station 240-1 (e.g., assume $S_2 > S_1 + B$).

In FIG. 5B, base station 240-1 may determine whether to hand over the first session with mobile device 210-1 and/or the second session with mobile device 210-2 to base station 240-2. Because base station 240-1 is a macrocell type and base station 240-2 is a small cell type, base station 240-1 may apply the first set of rules.

Base station 240-1 may determine not to hand over the first session with mobile device 210-1 based on rule 1A. In other words, because $S_2 > S_1 + B$ and because mobile device 210-1 is traveling at a speed $V_{MD}$ of 10 mps, which is greater than the threshold speed $V_T$ of 2 mps, base station 240-1 may determine not to hand over the first session to base station 240-2 and to continue to service the first session.

On the other hand, base station 240-1 may determine to hand over the second session with mobile device 210-2 based on rule 1C. In other words, because $S_2 > S_1 + B$ and because mobile device 210-2 is traveling at a speed $V_{MD}$ of 1 mps, which is less than the threshold speed $V_T$ of 2 mps, base station 240-1 may determine to hand over the second session to base station 240-1. Accordingly, base station 240-1 may hand over the second session to base station 240-2.

Figure 5C:
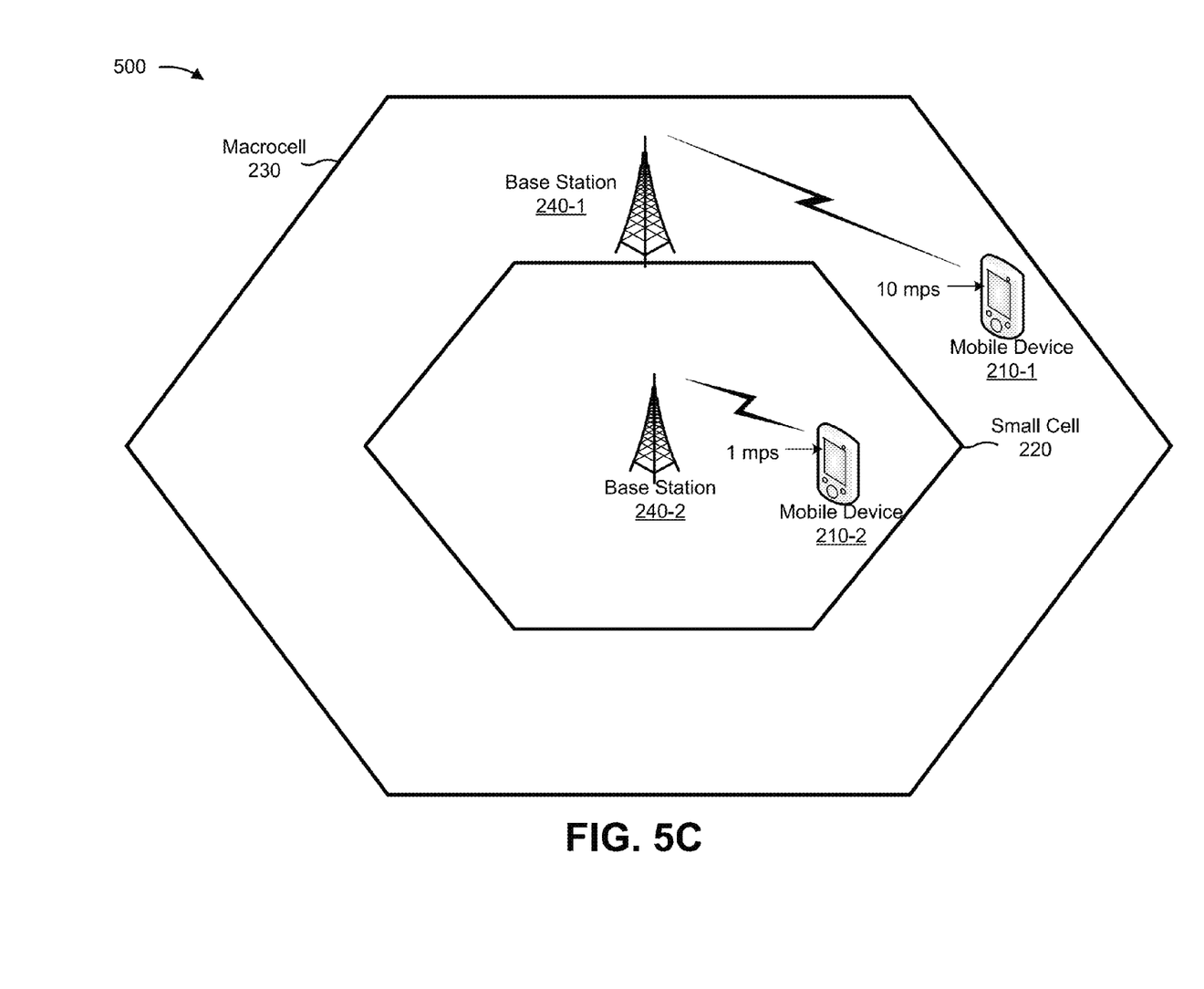

As shown in FIG. 5C, mobile device 210-1 may move out of the area covered by small cell 220 into an area covered by macrocell 230 at time t3. Because mobile device 210-2 is moving slower than mobile device 210-1, mobile device 210-2 may be in the area covered by small cell 220 for a longer period of time than mobile device 210-1, and may still be in the area covered by small cell 220 at time $t_3$. Assume mobile device 210-1 continues traveling at a speed of 10 mps at time $t_3$. Also, assume mobile device 210-2 continues traveling at a speed of 1 mps at time $t_3$.

Assume mobile device 210-1 does not receive a signal from base station 240-2 included in small cell 220 because mobile device 210-1 is outside of an area covered by small cell 220. Accordingly, base station 240-1 may not hand over the first session to base station 240-1 and base station 240-1 may continue to service the first session. In this way, handovers to small cell 220 may be avoided as mobile device 210-1 travels at relatively fast speed through small cell 220.

Further, assume mobile device 210-2 sends signal strength information to base station 240-2, which is currently servicing the second session. Assume the signal strength information indicates that, for the second session, the signal strength $S_1$ from base station 240-2 is stronger than the signal strength S2 from base station 240-1 (e.g., assume $S_2 < S_1 + B$). Because base station 240-1 is a macrocell type and base station 240-2 is a small cell type, base station 240-2 may apply the second set of rules to determine if the second session should be handed over from base station 240-2 to base station 240-1.

Base station 240-2 may determine not to hand over the first session with mobile device 210-1 based on rule 2D. In other words, because $S_2 < S_1 + B$ and because mobile device 210-1 is traveling at a speed $V_{MD}$ of 1 mps, which is less than the threshold speed $V_T$ of 2 mps, base station 240-2 may determine not to hand over the second session to base station 240-1 and to continue to service the second session.

Figure 5D:
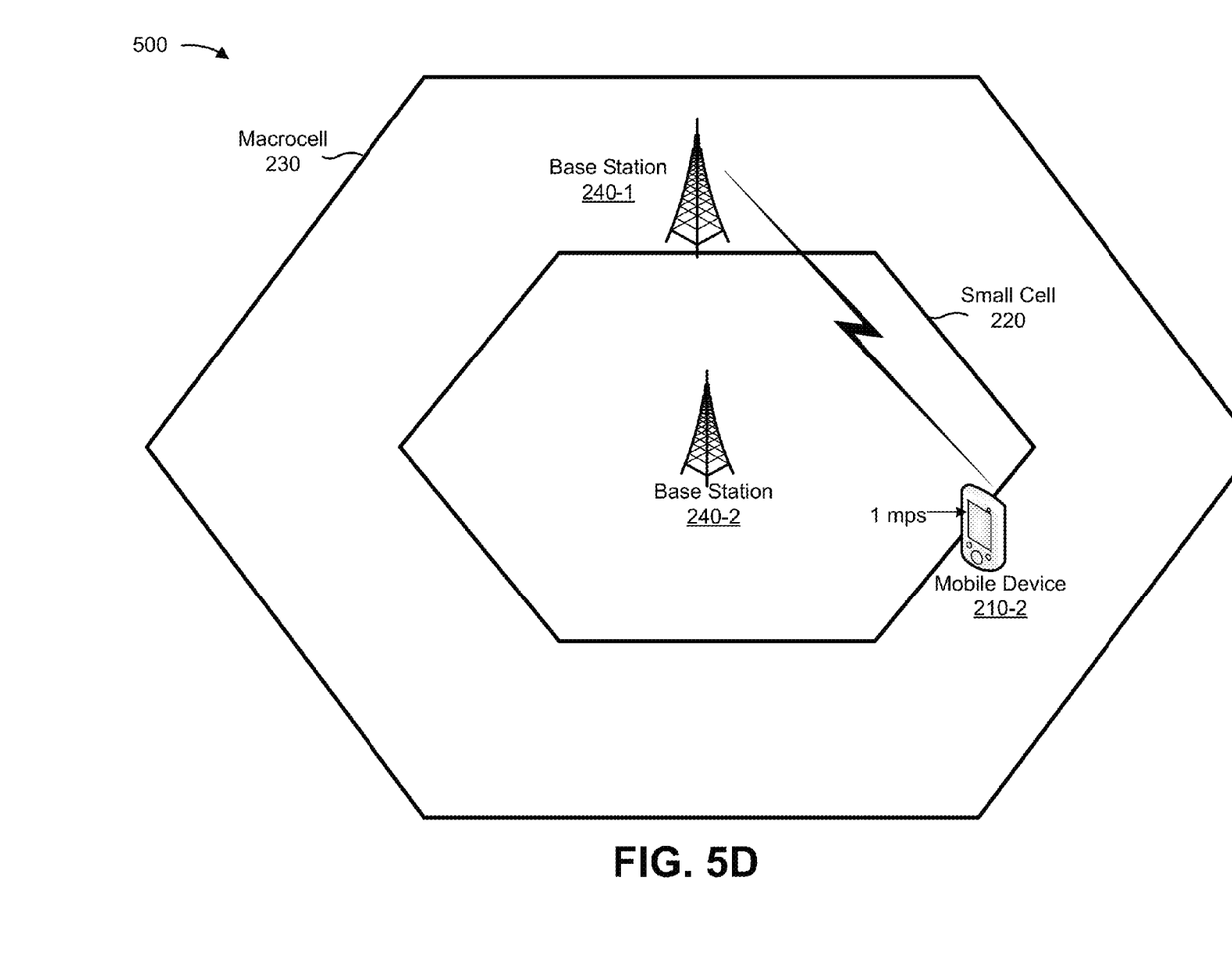

As shown in FIG. 5D, mobile device 210-2 may move to an edge of the area covered by small cell 220 at time $t_4$.

Further, assume mobile device 210-2 sends signal strength information to base station 240-2, which is currently servicing the second session. Assume the signal strength information indicates that, for the second session, the signal strength $S_1$ from base station 240-2 is weaker than the signal strength $S_2$ from base station 240-1 (e.g., assume $S_2 > S_1 + B$). Because base station 240-1 is a macrocell type and base station 240-2 is a small cell type, base station 240-2 may apply the second set of rules to determine if the second session should be handed over from base station 240-2 to base station 240-1.

Base station 240-2 may determine to hand over the first session with mobile device 210-1 based on rule 2C. In other words, because $S_2 > S_1 + B$ and because mobile device 210-1 is traveling at a speed $V_{MD}$ of 1 mps, which is less than the threshold speed $V_T$ of 2 mps, base station 240-2 may determine to hand over the second session to base station 240-1.

Accordingly, base station 240-2 may hand over the session to base station 240-1 and base station 240-1 may service the session. In this way, the second session with mobile device 210-2 may be handed over as mobile device 210-2 travels through small cell 220 at a relatively slow speed.

As indicated above, FIGS. 5A-5D are provided merely as an example. Other examples are possible and may differ from what was described with regard to FIGS. 5A-5D.

Implementations described herein may hand over a session with a mobile device based on a speed at which the mobile device is traveling. Accordingly, excessive handovers between small cells and small cells, and/or between small cells and macrocells, may be avoided, thus reducing dropped calls, increasing throughput, and/or improving an overall user experience.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      establish a session with a mobile device,
         the session allowing the mobile device to communicate with an operator network via the device;
      determine a speed at which the mobile device is traveling;
      determine a cell type for a neighbor base station,
         the cell type indicating a type of cell that the neighbor base station services; and
      selectively hand over the session to the neighbor base station based on the speed at which the mobile device is traveling and the cell type for the neighbor base station,
         where the one or more processors are to hand over the session to the neighbor base station when a first signal strength is less than a second signal strength and the speed fails to satisfy a threshold speed,
            the first signal strength indicating a strength of a first signal from the device received at the mobile device, and
            the second signal strength indicating a strength of a second signal from the neighbor base station received at the mobile device.

2. The device of claim 1, where the one or more processors, when determining the speed at which the mobile device is traveling, are to:
   calculate a Doppler value based on a coherent demodulation of a signal used during the session; and
   determine the speed at which the mobile device is traveling based on the Doppler value.

3. The device of claim 2, where the one or more processors, when determining the speed based on the Doppler value, are to:
   determine the speed based on the Doppler value and a frequency of the signal.

4. The device of claim 1, where the one or more processors are further to:
   receive speed information from the mobile device that indicates the speed at which the mobile device is traveling, and
   where the one or more processors, when determining the speed at which the mobile device is traveling, are to:
      determine the speed at which the mobile device is traveling based on the speed information received from the mobile device.

5. The device of claim 1, where the cell type for the neighbor base station is a first cell type, and where the one or more processors are further to:
   determine a second cell type for the device,
      the second cell type indicating a type of cell that the device services; and
   where the one or more processors, when selectively handing over the session, are further to:
      selectively hand over the session to the neighbor base station based on the first cell type, and the second cell type.

6. The device of claim 1, where the one or more processors, when selectively handing over the session, are to:
   prevent handing over the session to the neighbor base station when the speed satisfies the threshold speed and when the cell type of the neighbor base station is a small cell type.

7. The device of claim 1, where the one or more processors, when determining the speed at which the mobile device is traveling, are to:
   determine a block error rate (BLER) of a signal associated with the mobile device; and
   determine the speed at which the mobile device is traveling based on the BLER.

8. A non-transitory computer-readable medium storing instructions, the instructions comprising:
   one or more instructions that, when executed by one or more processors, cause the one or more processors to:
      cause a base station to establish a session with a mobile device,
         the session allowing the mobile device to communicate with or via an operator network via the base station;
      determine a speed of the mobile device;
      determine a first signal strength,
         the first signal strength indicating a strength of a first signal from the base station received at the mobile device;
      determine a second signal strength, the second signal strength indicating a strength of a second signal from a neighbor base station received at the mobile device; and selectively hand over the session to the neighbor base station based on the speed of the mobile device, the first signal strength, and the second signal strength, where the one or more instructions cause the one or more processors to prevent handing over the session to the neighbor base station when the first signal strength is less than or equal to the second signal strength, the speed satisfies a threshold speed, the first signal strength satisfies a threshold signal strength, and based on a first cell type, and a second cell type, the first cell type being a cell type of the base station, and the second cell type being a cell type of the neighbor base station.

9. The non-transitory computer-readable medium of claim 8, where the one or more instructions, when executed by the one or more processors, further cause the one or more processors to:

receive signal strength information from the mobile device; and where the one or more instructions, that cause the one or more processors to determine the first signal strength and determine the second signal strength, further cause the one or more processors to:

determine the first signal strength and the second signal strength based on the signal strength information.

10. The non-transitory computer-readable medium of claim 8, where the one or more instructions, that cause the one or more processors to selectively hand over the session to the neighbor base station, further cause the one or more processors to:

prevent handing over the session to the neighbor base station when the first signal strength satisfies a threshold signal strength.

11. The non-transitory computer-readable medium of claim 8, where the one or more instructions, that cause the one or more processors to selectively hand over the session to the neighbor base station, further cause the one or more processors to:

hand over the session to the neighbor base station when the speed fails to satisfy the threshold speed and when the first signal strength is less than the second signal strength.

12. The non-transitory computer-readable medium of claim 8, where the one or more instructions, that cause the one or more processors to selectively hand over the session to the neighbor base station, further cause the one or more processors to:

hand over the session to the neighbor base station when the speed satisfies the threshold speed and when the first signal strength is greater than or equal to the second signal strength.

13. The non-transitory computer-readable medium of claim 8, where the one or more instructions, that cause the one or more processors to selectively hand over the session to the neighbor base station, further cause the one or more processors to:

prevent handing over the session to the neighbor base station when the speed fails to satisfy the threshold speed and when the first signal strength is greater than or equal to the second signal strength.

14. The non-transitory computer-readable medium of claim 8, where the one or more instructions, that cause the one or more processors to determine the speed of the mobile device, cause the one or more processors to:

calculate a Doppler value based on a coherent demodulation of a signal used during the session; and determine the speed of the mobile device based on the Doppler value.

15. A method, comprising:

establishing, by a base station, a session with a mobile device, the session allowing the mobile device to communicate with or via an operator network via the base station;

determining, by the base station, a speed of the mobile device;

determining, by the base station, a first cell type of the base station and a second cell type of a neighbor base station;

determining, by the base station, a first signal strength, the first signal strength indicating a strength of a first signal from the base station received at the mobile device;

determining, by the base station, a second signal strength, the second signal strength indicating a strength of a second signal from the neighbor base station received at the mobile device; and selectively handing over, by the base station, the session to the neighbor base station based on the speed of the mobile device, the first cell type, the second cell type, the first signal strength, and the second signal strength, the selectively handing over the session to the neighbor base station comprising handing over the session to the neighbor base station when the first signal strength is less than the second signal strength and the speed fails to satisfy a threshold speed.

16. The method of claim 15, where selectively handing over the session further comprises:

preventing handing over the session to the neighbor base station when the first signal strength is less than or equal to the second signal strength, the speed satisfies the threshold speed, the first cell type is a macrocell type, and the second cell type is a small cell type.

17. The method of claim 15, where selectively handing over the session further comprises:

handing over the session to the neighbor base station when the first signal strength is greater than or equal to the second signal strength, the speed satisfies the threshold speed, the first cell type is a small cell type, and the second cell type is a macrocell type.

18. The method of claim 15, where selectively handing over the session further comprises:

preventing handing over the session to the neighbor base station when the first signal strength is greater than or equal to the second signal strength and the speed fails to satisfy the threshold speed.

19. The method of claim 15, where determining the speed of the mobile device comprises:

calculating a Doppler value based on a coherent demodulation of a signal used during the session; and determining the speed of the mobile device based on the Doppler value.

20. The method of claim 15, further comprising:

receiving speed information from the mobile device that indicates the speed of the mobile device; and where determining the speed of the mobile device comprises:

determining the speed of the mobile device based on the speed information received from the mobile device.

* * * * *